(12) United States Patent
Haskin et al.

(10) Patent No.: US 9,109,886 B1
(45) Date of Patent: Aug. 18, 2015

(54) TIME-OF-FLIGHT OF LIGHT CALIBRATION

(71) Applicant: Rawles LLC, Wilmington, DE (US)

(72) Inventors: Menashe Haskin, Palo Alto, CA (US); Edward Dietz Crump, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 13/647,603

(22) Filed: Oct. 9, 2012

(51) Int. Cl.
*G01C 3/08* (2006.01)

(52) U.S. Cl.
CPC ........................................ *G01C 3/08* (2013.01)

(58) Field of Classification Search
CPC ........... H05B 37/02; G01C 3/08; G01N 21/00
USPC ............. 356/3.01–3.15, 4.01–4.1, 5.01–5.51, 356/6–22, 28, 28.5
See application file for complete search history.

(56) References Cited

U.S. PATENT DOCUMENTS

| | | | |
|---|---|---|---|
| 4,820,041 A * | 4/1989 | Davidson et al. ............ | 356/3.12 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 2008/0036187 A1 * | 2/2008 | Breed ........................... | 280/735 |
| 2012/0223885 A1 | 9/2012 | Perez | |

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

\* cited by examiner

*Primary Examiner* — Luke Ratcliffe
(74) *Attorney, Agent, or Firm* — Lee & Hayes, PLLC

(57) ABSTRACT

Calibration of devices may be performed to determine a relative location of the devices. The devices may be used to determine distances of surfaces within an environment. The calibration may be performed at different times and/or in response to triggering events to determine a relative location of each of the devices in an environment. After the relative location of the devices is known, the devices may be used to determine a distance of a surface within the environment. In various embodiments, a light sensor may identify a light emitter based on characteristics of the light emitted by the light emitter.

25 Claims, 12 Drawing Sheets

TIME-OF-FLIGHT OF LIGHT CALIBRATION

BACKGROUND

A distance between objects can be measured by emitting light and measuring a time-of-flight of the light between the objects. Traditional measurement of light using time-of-flight uses light and calculates a distance based on the amount of time between the emission of the light and a time when the light is captured at a sensor. Typically, the sensor is located near a light emitter that emits the light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques to determine relative locations of sensor devices that are used to determine distances of surfaces and objects within an environment. In some embodiments, the sensor devices may be time-of-flight (ToF) sensors that determine ToF values pertaining to relative distance information. The systems and techniques may use data from two or more light sensors which capture light from a same light emitter. At least one light sensor may be located in a sensor pod that is separate from the light emitter that is currently emitting light. The separate light sensor(s) may be housed in the sensor pod with or without a currently active light emitter. The sensor pod may coordinate operation with an emitter pod, which contains the light emitter that is currently emitting light, to enable determination of relative distance information using light received (detected, captured) from the light emitter.

In some embodiments, the calibration may be performed at different times and/or in response to triggering events to determine a relative location of each of the devices in an environment. After the relative location of the devices is known, the devices may be used to determine a distance of a surface within the environment. In various embodiments, a light sensor may identify a light emitter based on characteristics of the light emitted by the light emitter.

The determined distance may be used to determine movement of a surface and/or one or more pixels that correspond to locations of a surface. In some instances, the determined distance may be used to identify a profile of a surface, which may then be used to associate the profile with an object, a command, or another association.

The systems and techniques described herein may be implemented in a number of ways. Example implementations are provided below with reference to the following figures.

Figure 1:
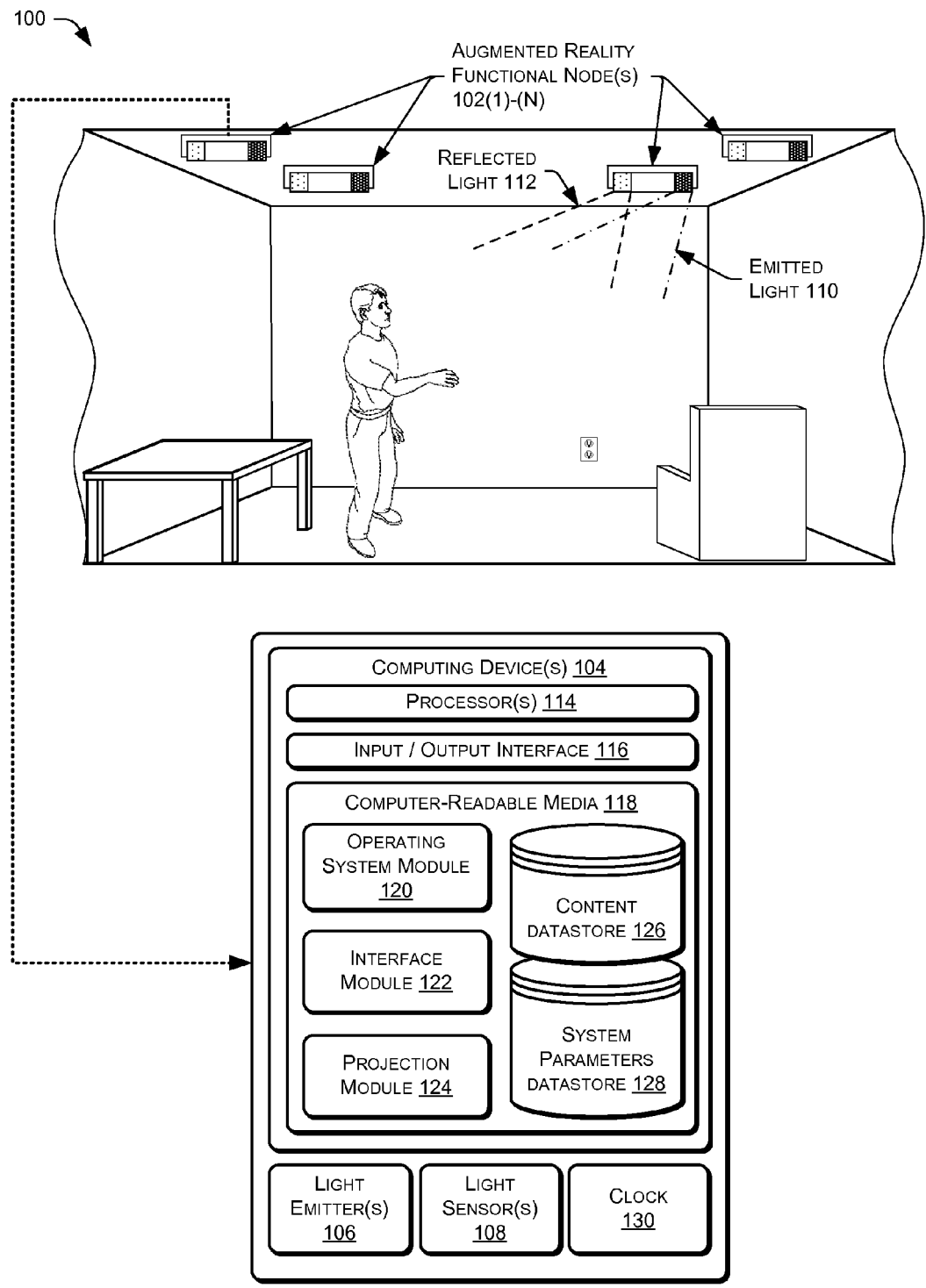
FIG. 1 illustrates an environment that includes an augmented reality functional node (ARFN) and a user that may interact with the ARFN.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more light emitters 106 that, when active, emit light onto any surface within the environment 100.

In some embodiments, the light emitter(s) 106 may include one or more projectors that project content onto any surface. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more light sensor(s) 108 that may capture light that is emitted from the light emitter(s) 106 and reflected off a surface.

In some embodiments, the light sensor(s) may be used to determine movement of surfaces, such as movement of user operating the UI. In response, the ARFN 102 may provide feedback to the user and/or may cause performance of actions corresponding to the user's operation of the UI. For instance, when the ARFN 102 projects a remote control, the ARFN 102 may provide feedback to the user indicating which button(s) a user is in position to select, may identify a user's selection (e.g., a selection to power on the television) and, in response, may operate the television according to an identified selection. While a few examples have been given, it is to be appreciated that the ARFN 102 may project any other sort of content within the environment 100. In addition, the ARFN 102 may recognize and interpret gestures that are made by the user without reference to a UI projected within the environment. In addition, the ARFN 102 may recognize and interpret gestures that are made by the user, and based on the gestures, generate a UI (e.g., a virtual UI) projected within the environment.

In this example, one of the ARFNs 102 within the environment is shown to provide emitted light 110 as pulses of light. In addition, the ARFN may capture reflected light 112 within the environment for the purpose of identifying distances between the ARFN and a surface that reflects the light.

While FIG. 1 illustrates one ARFN emitting the emitted light 110 and receiving the reflected light 112, in some implementations, one or more other ARFNs may additionally or alternatively perform one or both of these functions. In either instance, by scanning the environment in this manner, the ARFNs 102 may identify the location (e.g., distances) of objects within an environment and movement of the objects. In some instances, the objects may be people and the movements may be gestures performed by people within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
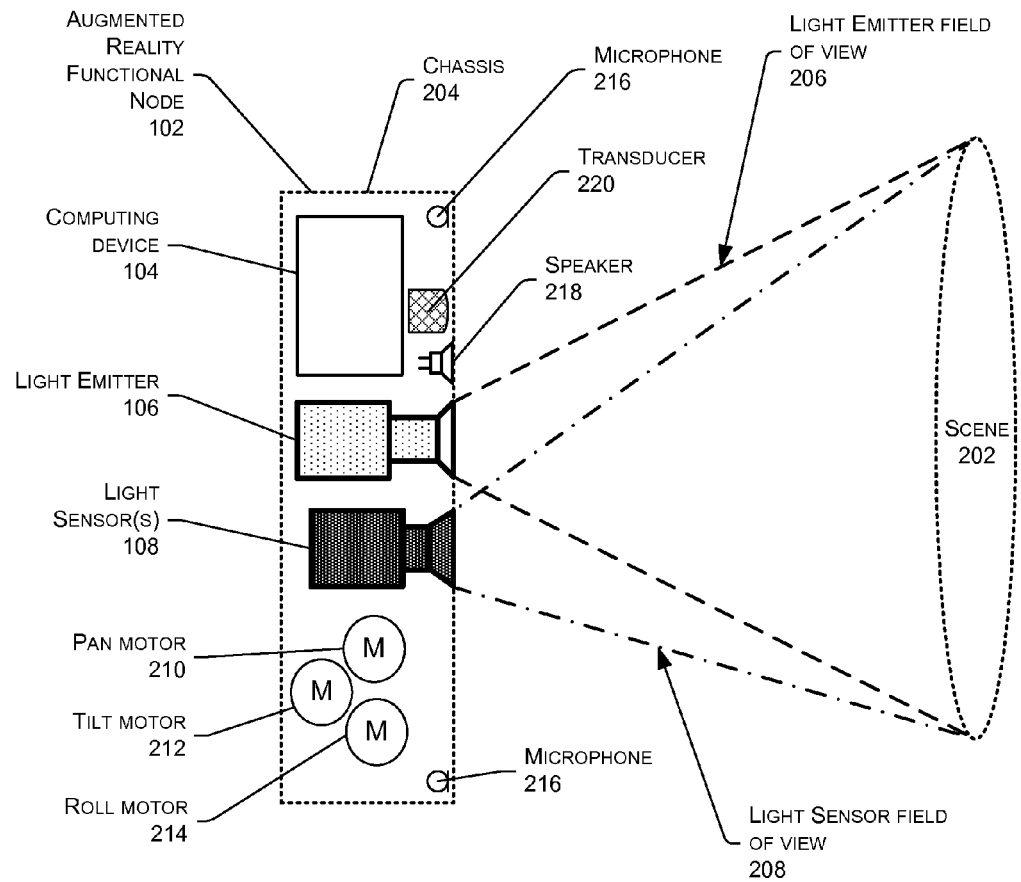
FIG. 2 illustrates an example ARFN that includes a computing device, a light emitter, light sensor(s), and other selected components for allowing a user to interact with the ARFN.

The input/output interface 116, meanwhile, may be configured to couple the computing device 104 to other components of the ARFN 102, such as the light emitter 106, the light sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the light emitter 106 or the light sensor 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse data captured by the light sensors 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the light emitter 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

The computer-readable media 118 may store the system parameters datastore 128, which is configured to maintain information about the state of the computing device 104, the light emitter 106, the light sensor 108, and so forth. For example, and as described in detail below, the ARFN 102 may be configured to pan and tilt for the purpose of allowing the light emitter 106 and the light sensor 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

In some embodiments, the computing device 104 may include a clock 130 to generate a clock cycle. The clock cycle may be used by the light emitters 106 and/or the light sensors 108 to control operation of the respective devices during time-of-flight of light measurements as discussed in greater detail below. In some instances, the clock 130 may be integrated with the processor(s) 114, one or more of the light emitter(s), 106, or another device.

FIG. 2 shows additional details of an example ARFN 102 that may be configured to measure distances of surfaces, identify movement of the surfaces (or objects), project a user interface (UI), and/or to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light emitters 106 may be disposed within the chassis 204 and may be configured to generate and project light and/or images into the scene 202. The light may include visible light, non-visible light, or both. The images may be visible light images perceptible to the user, visible light images imperceptible to the user, images with non-visible light, or a combination thereof. The light emitter 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light emitter 106 may have a light emitter field of view 206 which describes a particular solid angle. The light emitter field of view 206 may vary according to changes in the configuration of the light emitter 106. For example, the light emitter field of view 206 may narrow upon application of an optical zoom to the light emitter 106. The light emitter field of view 206 may result in emission of light over a small surface area or a larger surface area.

One or more light sensors 108 may also be disposed within the chassis 204. The light sensors 108 are configured to receive light emitted by the light emitter 106 and reflected off a surface in the scene 202. Thus, the light sensors 108 receive reflected light. The light sensors 108 have a light sensor field of view 208 that describes a particular solid angle. The light sensor field of view 208 may vary according to changes in the configuration of the light sensor(s) 108. For example, an optical lens included with one of the light sensors may narrow the light sensor field of view 208. The light sensor field of view 206 may result in capture of light from a small surface area or a larger surface area, and may align with the light emitter field of view 206.

In some implementations, a plurality of light sensors 108 may be used where each light sensor includes a photodiode and a storage element. In some embodiments, a light sensor may be equipped a photodiode that is shared by a plurality of storage elements (e.g., capacitors, charge-coupled devices (CCD), etc.), which each store energy during intervals of time. These storage elements may be used to create data that indicates a distance of an object or surface in the scene 202, as explained in further detail below regarding discussion of time-of-flight of light. In some embodiments, the storage elements may be capacitors, charge-coupled devices, or a combination thereof.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the light emitter(s) 106 and/or the light sensor(s) 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. As mentioned above, microphones 216 and speakers 218 may be distributed throughout the scene. The light emitter 106 and the light sensor 108 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
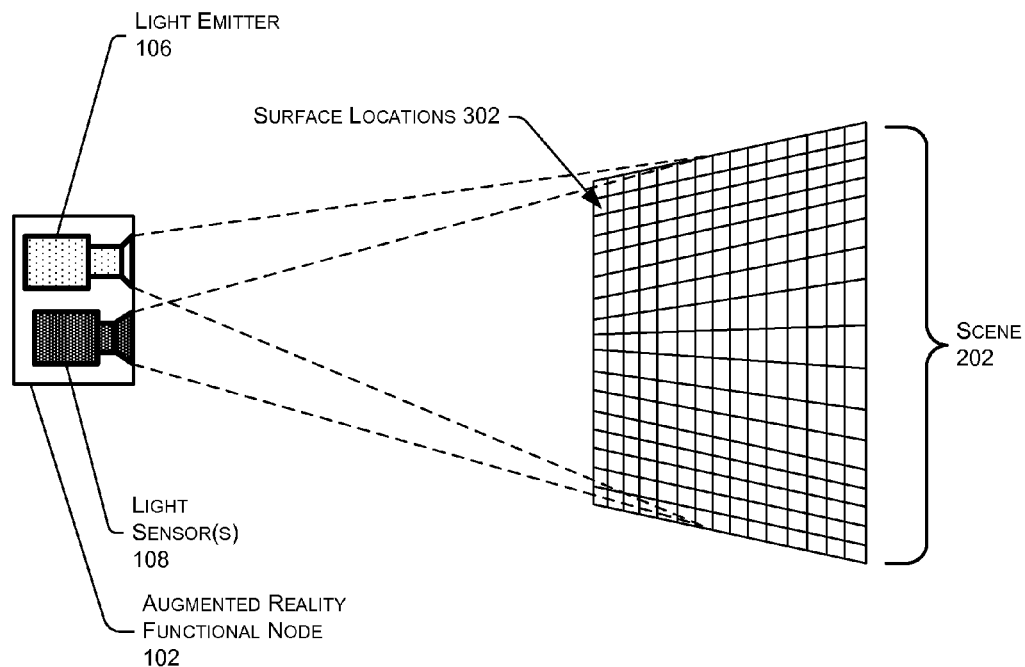
FIG. 3 is an illustrative diagram of the ARFN using a light emitter and time-of-flight (ToF) light sensors to identify surfaces, objects, and user interactions within an environment. By identifying user interactions, the ARFN is able to determine when a user is requesting that the ARFN perform a specified action.

FIG. 3 is an illustrative diagram of the ARFN 102 using time-of-flight (TOF) information to determine location and distance information regarding users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects.

In the instant illustration, the light emitter 106 emits pulses of light onto the scene 202. The pulses of light may be synchronized with a clock cycle from the clock 130 and include intervals of "on" and "off", which can be represented by a square wave. The pulses of light may be emitted in wavelengths that are visible to the user, non-visible to the user, or a combination thereof.

The light sensors 108 may be used to receive the emitted light after the light is reflected off objects or surfaces in the scene 202. The light sensors 108 may measure reflected light at specific surface locations 302 to determine a distance of objects or surfaces in the scene 202. For example, a pair of sensors may be used to measure the distance of a surface of a plurality of surface locations that reflect light. The surface locations 302 may be mapped over a wall, over objects (including people), or over any other surface included in an environment. The light sensors 108 may include elements to store measured light for each of the surface locations 302. Thus, the light sensors 108 may store a pixilated view of the surface locations, which may later be used to reproduce information about the scene 202.

The surface locations 302 may be represented as a grid for ease of illustration and not as a limitation. In other implementations other patterns, such as bars, dots, and so forth may be used. For example, the scene 202 may be analyzed as the plurality of surface locations 302 in a grid of [A×B] size, where the number of surface locations 302 is the product of A and B. For example, if the grid is [320×240], then the number of surface locations 302 is 76,800. Thus, in the example above, each of the 76,800 surface locations may be sensed by respective pairs of light sensors, thus 153,600 light sensors may be used in this example when two light sensors are used for each surface location. Other quantities of light sensors may also be used. The light sensors 108 may be formed on one or more silicon chips. For example, the light sensors 108 may be implemented as capacitors that store energy associated with an amount of light received from a respective surface location during a predetermined amount of time.

Figure 4:
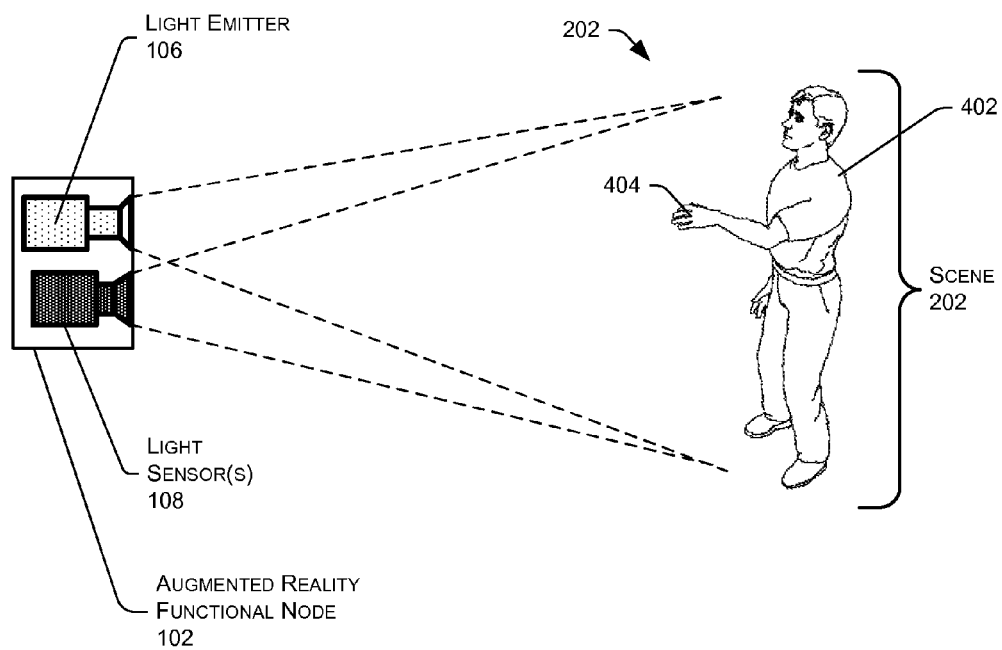
FIG. 4 is an illustrative diagram of the ARFN detecting the pose of a person within an environment.

FIG. 4 is an illustrative diagram of the ARFN 102 detecting the pose of a person within an environment. As discussed above, the light sensors 108 detect the light reflected from surfaces within the scene 202. The light sensors 108 may provide data that enables identification of a user 402 and/or other objects within the environment. In some instances, this information may be utilized to identify user gestures and trajectories of these gestures, such as a trajectory of a hand 404 of the user 402 or other body part of the user 402. The light sensors 108 may also provide data that can be used to identify a location of a selection tool (e.g., a user's finger) as this location changes over time. The ARFN 102 may then use these locations tracked over time to identify a trajectory of the gesture.

FIGS. 5A-5D illustrate techniques to perform distance calculations by capturing light emitted by a light emitter and reflected off a surface. The captured light is used to determine a distance from the surface.

Figure 5A:
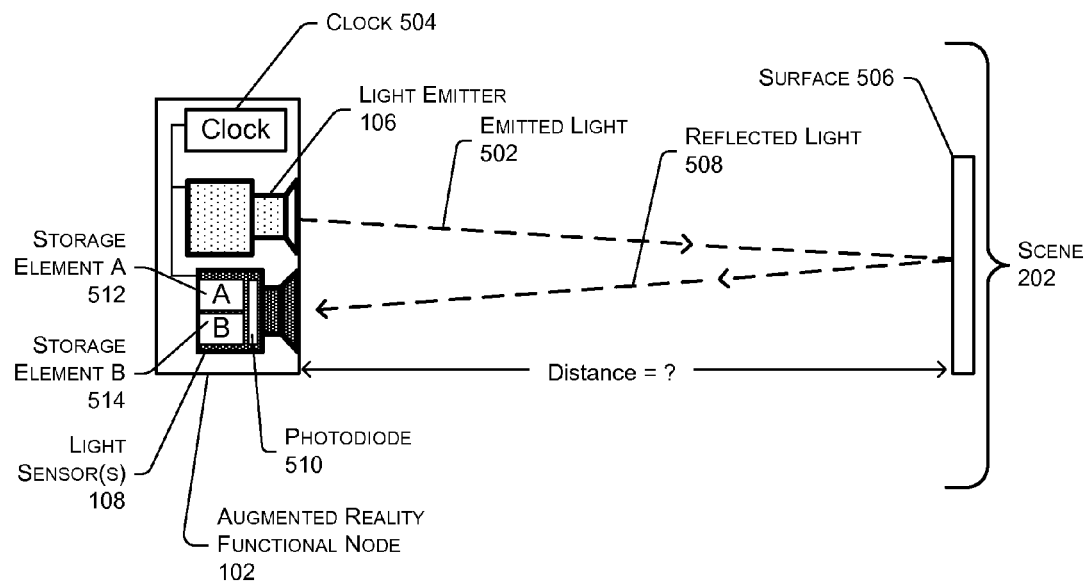
FIGS. 5A-5D illustrate basic techniques to perform distance calculations by capturing light emitted by a light emitter and reflected off a surface. The captured light is used to determine a distance from the surface.

FIG. 5A shows the light emitter 106 that emits light (emitted light 502) projected in a direction toward the scene 202. The emitted light 502 is generated by pulsing light on and off by the light emitter 106 based on a clock cycle from a clock 504. The pulses of light may be represented by a square wave, which is shown and discussed with reference to FIG. 5B. However, other pulses patterns may be employed that do not include equal lengths of time (e.g., emit light for 0.25 μs every 1 μs, etc.) Meanwhile, the emitted light 502 may be reflected off a surface 506, such as off an object, a person, clothing, tools, and so forth. Reflected light 508 may travel back toward the light sensor(s) 108.

In accordance with one or more embodiments, the light sensor(s) 108 may include a photodiode 510, a storage element A 512 and a storage element B 514. In these embodiments, the photodiode 510 may be shared by multiple storage elements. However, some configurations may include a separate photodiode for each storage element. For the sake of the following discussion (and through this document), either configuration may be used. The storage elements A and B may store energy from the reflected light 508 captured by the photodiode at different intervals of time. For example, the storage element A 512 may cycle on at a first time and off at a second time while the storage element B 514 may cycle off at the first time and on at the second time in opposite alternation (inverse synchronization) with the storage element A 512. In some embodiments, additional storage element may be used in addition to the storage element A 512 and the storage element B 514, which may store energy from light at different intervals and/or overlapping intervals. The storage elements 512 and 514 may be capacitors or other hardware used to store energy converted from light. At some points, the discussion below may refer to a capture of light from different light sensors, however, it shall be understood that a light sensor with a shared photodiode can capture different time intervals of light using multiple storage elements, and thus may perform the function of multiple sensors.

Figure 5B:
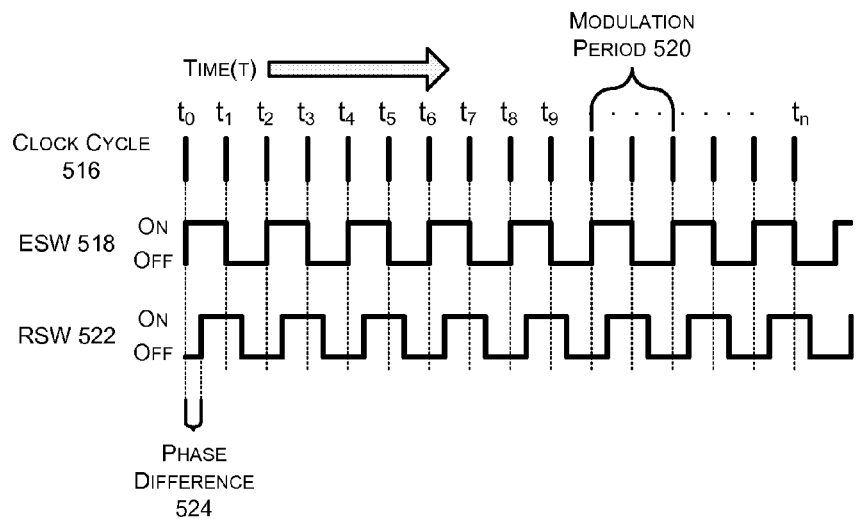

FIG. 5B shows a clock cycle 516 plotted with respect to time (t). The clock cycle 516 may be generated by the clock 504 and include equal segments of time based on a predetermined frequency. In addition, FIG. 5B shows an emitter square wave (ESW) 518 that represents a graph of the pulsing of light by the light emitter 106 between an on-state of operation and an off-state of operation. Although the various waves discussed herein are referred to as square waves, other types of waveforms may be employed to accomplish the same or similar results. In various embodiments, the on-state and the off-state may be equal in length of time and synchronized with the clock cycle 516. For example, the light emitter 106 may emit light for x clock cycles and then be off for x clock cycles until emitting light again for x clock cycles, and so forth. A modulation period 520 is defined by each complete cycle of the light emitter 106 operating the on-state and the off-state once. In the example above, the modulation period 520 is 2x.

FIG. 5B also shows a received square wave (RSW) 522 that represents a graph of the received pulses of the reflected light 508 as captured (stored, measured) by the light sensor 108. The RSW 522 shows when light is received (on) or not received (off), which is a function of the pulses of light generated by the light emitter 106. Unlike the ESW 518, the RSW 522 may not be synchronized with the clock cycle. A difference in the timing of the transitions of light (e.g., pulses) and the clock cycle is equal to a phase difference 524, which is shown in FIG. 5B, and dependent on a distance of travel of the reflected light 508. The phase difference may be used to determine a distance between the ARFN 102 and the surface 506. The use of the phase difference 524 is explained in further detail with reference to FIGS. 5C and 5D.

Figure 5C:
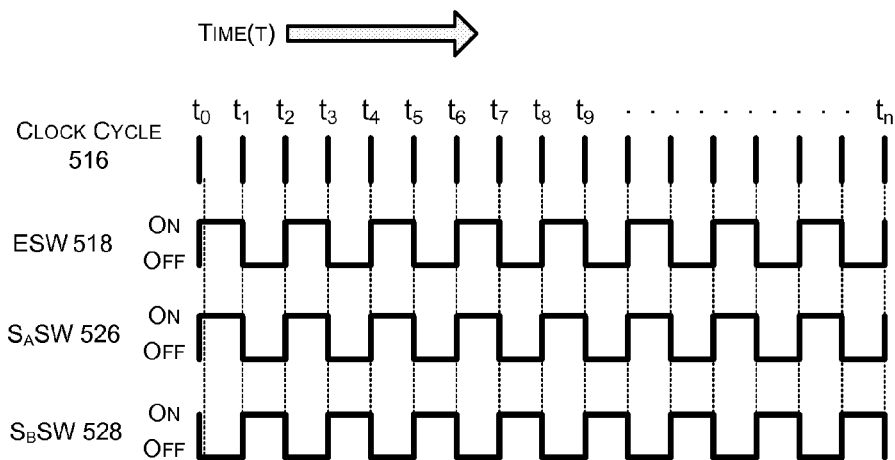

FIG. 5C shows the clock cycle 516, the ESW 518, and graphs depicting functionality of the light sensors 108 (i.e., the storage element A 512 and the storage element B 514) plotted with respect to time (t). In accordance with various embodiments, the storage element A 512 and the storage element B 514 may operate in synchronization with the clock cycle 516, and thus in synchronization with the ESW 518. In addition, the storage element A 512 may operate in opposite alternation (inverse synchronization) with the storage element B 514. Thus, when storage element A 512 is available to store energy from captured light, then storage element B 514 may be unavailable to store energy, and vice versa. A storage element A square wave ($S_A$SW) 526 shows an on-state and an off-state of the storage element A, where the storage element A and B are able to store energy when in the on-state and unable to store energy (e.g., off, blocked, disconnected, etc.) when in the off-state. The $S_A$SW 526 may be synchronized with the light emitter 106 (e.g., synchronized with the ESW 518, but not necessarily the same as the ESW). A storage element B square wave ($S_B$SW) 528 shows an on-state and an off-state of the storage element B, which is inversely synchronized with the $S_A$SW 526. The storage element A and B may be capacitors that receive a charge when light is captured by the photodiode 510 (i.e., the reflected light 508) during the on-state. The capacitors may be discharged after each modulation period or at other intervals (e.g., prior to oversaturation as discussed with reference to FIGS. 12 and 13). In various embodiments, additional storage elements may be employed in addition to the storage element A and B. In some embodiments, the storage element A and B may be implemented as separate sensors each having a photodiode that captures light in multiple time intervals (e.g., interval A and interval B), and so forth.

Figure 5D:
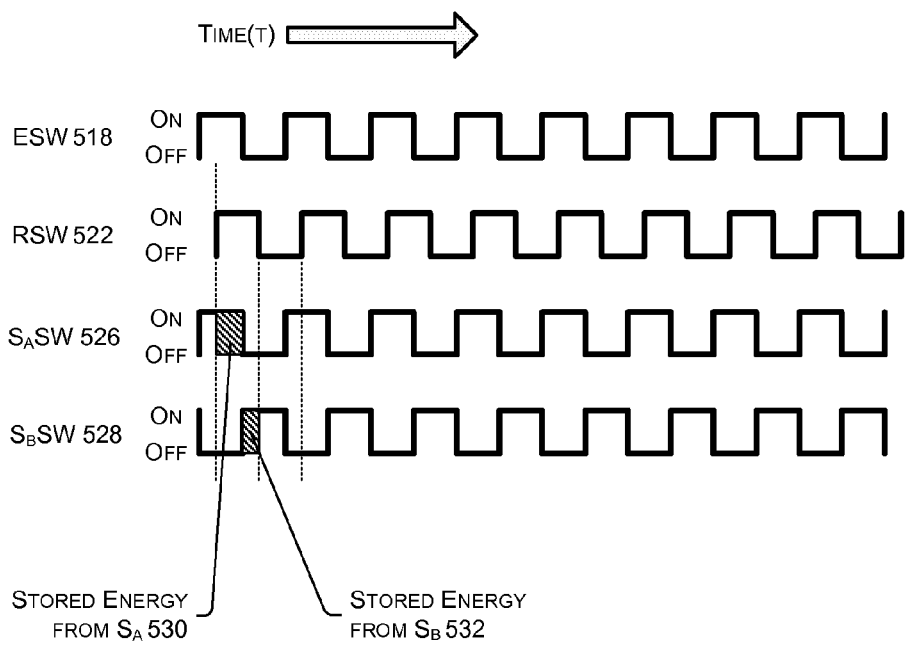

FIG. 5D shows the square waves discussed with reference to FIGS. 5B and 5C during an example plot of time-of-flight of pulses of light. When the $S_A$SW 526 is in the on-state and light is received by the light sensor(s) 108 (shown by the RSW 522), then the storage element A 512 may store energy from captured light such that an amount of light captured by the photodiode 510 can be measured during the on-state of the storage element A (e.g., by charging a capacitor, etc.). The amount of energy stored during this cycle of storage element A is shown as stored energy from storage element A ($SES_A$) 530. When the storage element A is in the off-state, the storage element A no longer stores energy, and thus the $SES_A$ 530 has achieved a maximum value during this modulation period. As discussed above, the storage element B 514 may transition to the on-state when the storage element A transitions to the off-state. When the $S_B$SW 528 is in the on-state and light is received by the light sensor(s) 108, then the storage element B 514 may store energy such that an amount of stored energy can be measured during the on-state of the storage element B (e.g., by charging a capacitor, etc.). The amount of energy stored during this cycle of storage element B is stored energy from storage element A ($SES_B$) 532. When the storage element B is in the off-state, the storage element B no longer stores energy, and thus the $SES_B$ 532 has achieved a maximum value during this modulation period.

Since light travels at a known velocity, a ratio of the $SES_A$ 530 and $SES_B$ 532 provides a linear plot, and thus allows calculation of a distance between the surface 506 and the ARFN 102 (or other known position) when the distance is within a predetermined range. The predetermined range is equivalent to the amount of time of the pulse of light (i.e., the on-state) from the light emitter 106 multiplied by the speed of light (approximately 300,000 km/s). For example, when the pulse is 0.5 µs, then the predetermined range is 150 meters. Thus, the ratio of the $SES_A$ 530 and $SES_B$ 532 enables determination of distances within a known 150 meter range in this example. Outside of this range, the ratio of $SES_A$ 530 and $SES_B$ 532 may correspond to different distances which have the same ratio value, such as distances of 75 meters and 225 meters in this example, both having ratios of 50:50 or one-half the predetermined distance. This creates an aliasing problem, which can be addressed in part by use of at least a third storage element or light sensor (i.e., to create another time interval) as discussed below with reference to FIGS. 7-9.

Figure 6:
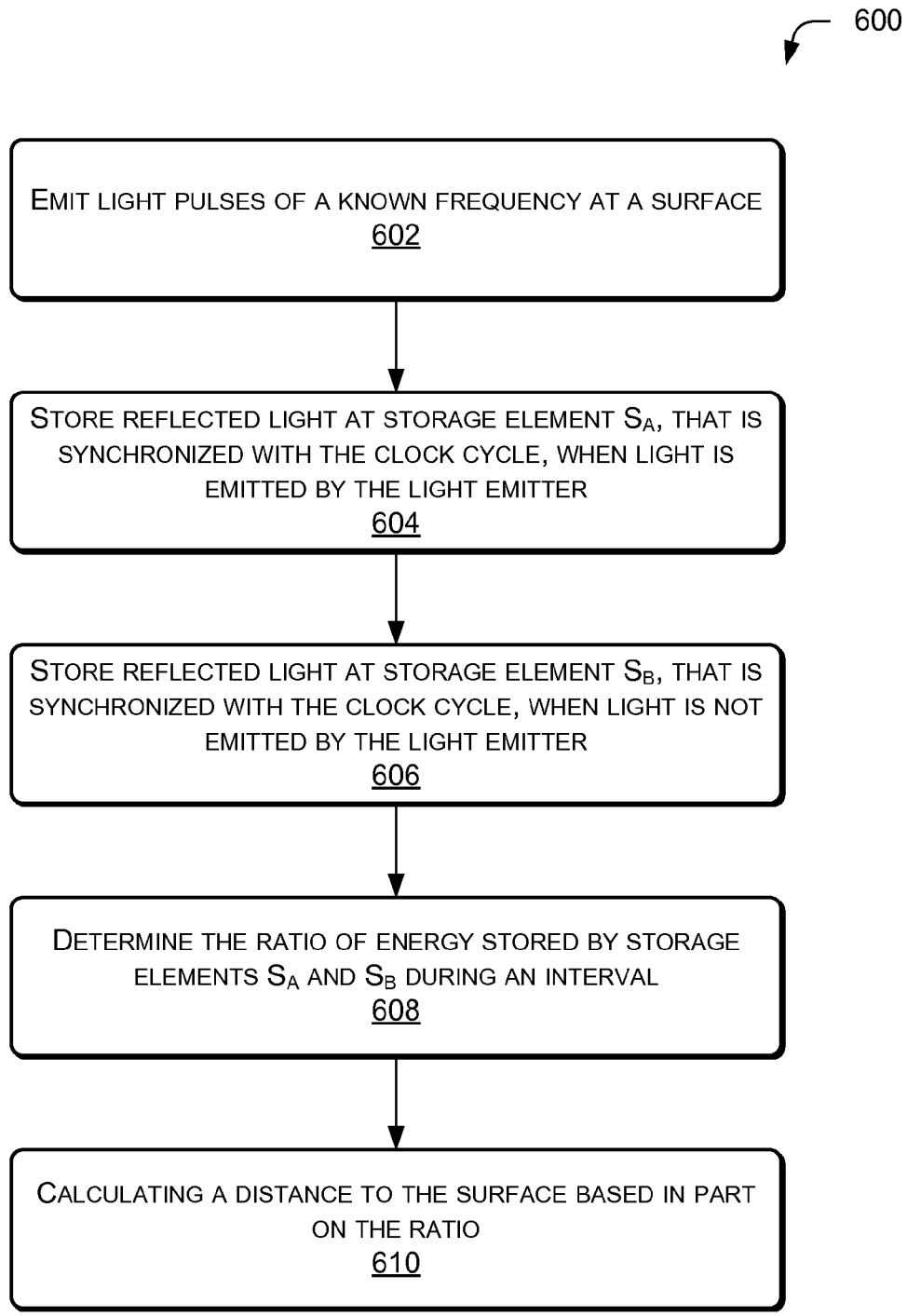
FIG. 6 illustrates a flow diagram of an illustrative process to calculate a distance using a ratio of light captured by various sensors or storage elements.

FIG. 6 illustrates an example flow diagram 600 of a process to calculate determine relative distance information using the ratio of light captured by various sensors or storage elements.

At 602, light pulses of a known frequency are emitted at a surface. The frequency may be synchronized with a clock cycle and may have equal lengths of time of emission of light and no emission of light (e.g., on/off). The light pulses may be represented by a square wave as shown in FIGS. 5B-5D; however, other waveforms may be used. The selection of the frequency determines the predetermined range of distances that can be determined using the ratio as discussed here. The selection of the frequency may also determine an accuracy of the measurements, and thus accuracy of the distance calculations. Distances outside of this range may have a same ratio when using two sensors or storage elements (e.g., $S_A$, $S_B$), and thus provide a duplication or aliasing effect.

At 604, reflected light is captured by the photodiode 510 and stored by the storage element A 512 when the storage element A is in the on-state and is able to store energy. The storage element A 512 may be synchronized with the clock cycle, and thus may store energy when the light emitter emits light in the on-state.

At 606, reflected light is captured by the photodiode 510 and stored by the storage element B 514 when the storage element B is in the on-state and is able to store energy. The storage element B 514 may operate in an opposite alternation with the storage element A, thus storage element B 514 may be operating in the on-state when the storage element A 512 is operating in the off-state. Therefore, the storage element B 514 may be inversely synchronized with the storage element A 512.

At 608, a ratio is determined for the amount of energy stored by the storage element A 512 ($SES_A$ 530) and the amount of energy stored by the storage element B 514 ($SES_B$ 532) during a modulation period or other interval of time.

At 610, a distance between the surface that reflects the light and the ARFN 102 is calculated based in part on the ratio, the predetermined frequency of the pulses of light, and the speed of light. As discussed above, the distance may need to be within a predetermined range to avoid a duplication or aliasing effect.

Figure 7:
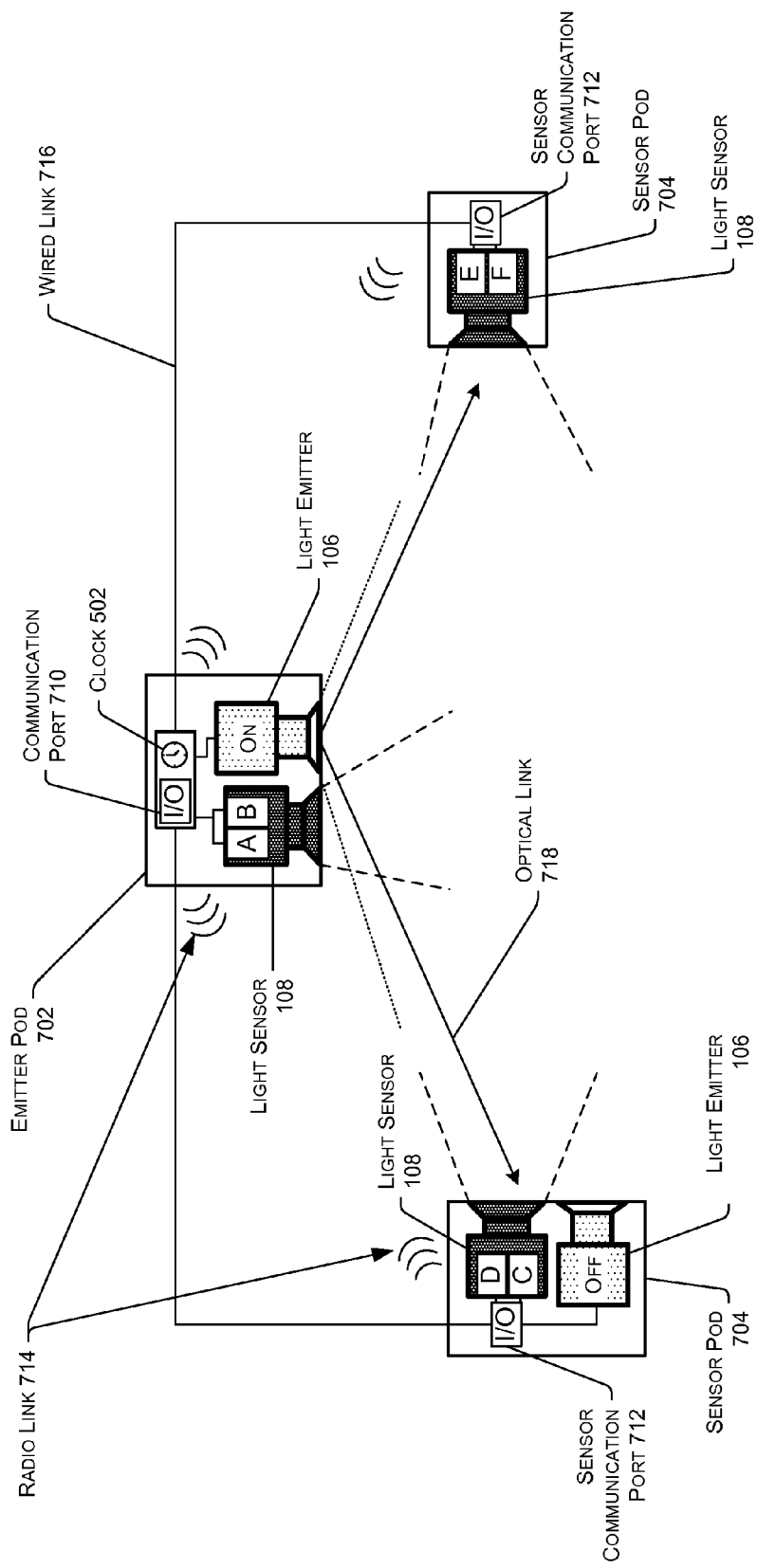
FIG. 7 illustrates an example environment that includes an emitter pod and sensor pod(s) that capture light emitted from the emitter pod. The environment shows various types of possible communications between the emitter pod and sensor pod(s).

FIG. 7 illustrates an example environment that includes an emitter pod 702 (e.g., the ARFN 102) and sensor pod(s) 704 that capture light emitted from the emitter pod. The terms "pod" and "unit" may be used interchangeably herein. As discussed herein, the emitter pod 702 includes the light emitter 106 that is currently emitting light (e.g., active, on, etc.) while the sensor pods include at least one of the light sensors 108 synchronized with the light emitter 106. Although only three light sensors are shown, the environment 700 may include more or fewer light sensors. In some embodiments, the sensor pods 704 may include light emitters that are not currently emitting light (e.g., inactive, off, etc.). However, the role of the pods may alternate as explained with reference to at least FIG. 8.

In some embodiments, the emitter pod 702 may include at least one of the light sensors 108. The emitter pod 702 may perform at least some of the calculations of distances using the light emitter 106 as described above with reference to FIGS. 5A-5D. For example, the emitter pod 702 may be equipped with one or more processors to perform the calculations.

The emitter pod 702 may include the clock 502 that creates the clock cycle for synchronization purposes and/or other purposes as described previously. The emitter pod 702 may not necessarily include a light sensor. In some embodiments, the light sensors 108 may be located exclusively or non-exclusively in the sensor pods and distributed or dispersed within the environment 700. For example, as shown in FIG. 1, a room may include various sensor pods and a single emitter pod (each referred to as ARFNs in the environment 100).

In various embodiments, the emitter pod 702 may include a communication port 710 (or input/output (I/O) port) to enable communications with each sensor pod through a sensor communication port 712. The communication port 710 and the sensor communication port 712 may be used to exchange data between the emitter pod 702 and the sensor pod 704.

As discussed above, the sensor pods 704 include at least one sensor synchronized with the light emitter 106. The environment 700 shows various types of possible links between the emitter pod and sensor pod(s) which may provide the synchronization. Some of the communications may be performed using the communication port 710 and sensor communication port 712.

In various embodiments, the emitter pod 702 may exchange data with the sensor pod 704 using a radio link 714 (e.g., wireless link). The radio link 714 may use any known radio transmission protocol, such as Wi-Fi, Bluetooth®, or other types of sound-based communication protocols. When the radio link 714 is used, the communication port 710 and the sensor communication port 712 may include transceivers to enable communication via the radio link 714. The radio link 714 may be used to initiate synchronization between the light emitter and the light sensors as described above. In some instances, the synchronization may be performed, in part, using data output from the clock 502.

In some embodiments, the emitter pod 702 may exchange data with the sensor pod 704 using a wired link 716. The wired link 716 may include any type of wired connection (i.e., physical connection) between the emitter pod 702 and the sensor pods 704. The wired link 716 may be used to initiate synchronization between the light emitter and the light sensors as described above. In some instance, the synchronization may be performed, in part, using data output from the clock 502.

In accordance with one or more embodiments, the emitter pod 702 may exchange data with the sensor pod 704 using an optical link 718. The optical link 718 may use the light emitter 106 and the light sensors 108. In some instances, the sensor pods 704 may be equipped with a light emitter to emit optical signals for receipt by the emitter pod 702. However, the sensor pods 704 may also communicate with the emitter pod 702 using at least one of the other links discussed above. The emitter pod 702 may emit light directly to each of the sensor pods. The optical link 718 may be used to initiate synchronization between the light emitter and the light sensors as described above. In some instance, the synchronization may be performed, in part, using data output from the clock 502.

In some embodiments, a combination of the various links discussed above may be used to facilitate communication between the emitter pod 702 and the sensor pod(s) 704 and/or possibly between two or more of the sensor pods. The configuration shown in FIG. 7 may be used to determine a relative location of light emitters, light sensors, or pods, as described with reference to FIG. 8.

Figure 8:
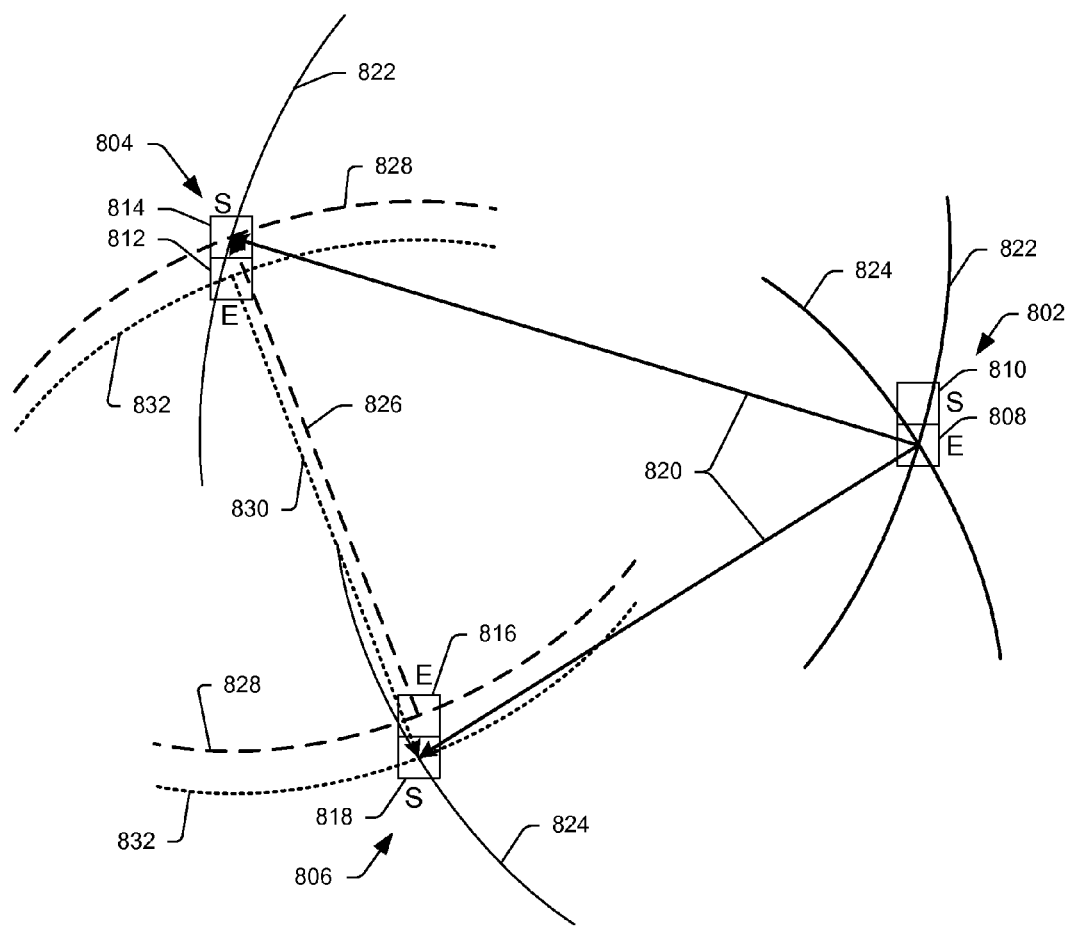
FIG. 8 illustrates an example environment to perform calibration where light sensors receive light directly from light emitters.

FIG. 8 illustrates an example environment to perform calibration where light sensors receive light directly from light emitters. The environment shows pods that include a light emitter and at least one light sensor. However, in some instances, some of the pods may only contain a light emitter or the at least one sensor, as will be evident following the description.

For description purposes, the environment used to describe an illustrative calibration includes a first pod 802, a second pod 804, and a third pod 806. The first pod 802 includes a first light emitter 808 and a first light sensor 810. The second pod 804 includes a second light emitter 812 and a second light sensor 814. The third pod 806 includes a third light emitter 816 and a third light sensor 818. However, other configurations may be used to perform the calibration. Each of the pods may be in communication with another pod as discussed with reference to FIG. 7, which may enable the pods to synchronize and thus determine distances based on captured light.

A calibration process may include emission of light 820 by the first light emitter 808. The light 820 may be received by the second light sensor 814 and the third light sensor 818. The light 820 received by the second sensor 814 may be used to determine a first distance profile 822 associated with the first pod 802 and the second pod 804, or more precisely, the first light emitter 808 and the second light sensor 814. The light 820 received by the third sensor 818 may be used to determine a second distance profile 824 associated with the first pod 802 and the third pod 806, or more precisely, the first light emitter 808 and the third light sensor 818. The distance profiles are arcs that represents possible locations of the light emitters and/or light sensors (or pods) based on the distances calculated using captured light. The arcs may be associated with the light emitter, the light sensor, the pod, or any combination thereof. Based on an intersection of the first distance profile 822 and the second distance profile 824, the relative location of the first light emitter 808 can be determined. However, the exact location of the other light emitters and/or other light sensors (or other pods) occurs following emission of light from another light emitter.

In various embodiments, the relative location of a light sensor or a light emitter in a pod may be used to determine a relative location of a respective pod. For example, each pod may include orientation information that may be used to determine relative locations of components (e.g. light emitters, light sensors, etc.) within the pod from an arbitrary location with the pod. The orientation information may be provided by sensors located within the pod, such as levels and other orientation-determining apparatus. Thus, determination of the relative location of the first light emitter 808 may be used to further determine a relative location of the first light sensor 810 and the first pod 802.

In accordance with various embodiments, another light emitter may emit light to create another distance profile, and thus precisely locate each of the pods relative to one another. As an example, the third light emitter 816 may emit light 826 that may be received by the second light sensor 814. The light 826 received by the second sensor 814 may be used to determine a third distance profile 828 associated with the second pod 804 and the third pod 806, or more precisely, the third light emitter 816 and the second light sensor 814. As another example, the second light emitter 812 may emit light 830 that may be received by the third light sensor 818. The light 830 received by the third sensor 818 may be used to determine a fourth distance profile 832 associated with the second pod 804 and the third pod 806, or more precisely, the second light emitter 812 and the third light sensor 818.

The relative distances of each pod may be determined by using the third distance profile 828 or the fourth distance profile 832, along with the first distance profile 822 and the second distance profile 824. Of course, the illustration shown in FIG. 8 describes a two dimensional (2D) approach. The relative distances may also be resolved in 3D space using a similar approach, which may rely on an X-Y-Z coordinate system or other coordinate systems.

In various embodiments, additional sensors and/or light emitters may be deployed (initially or at a later time) in the environment shown in FIG. 8. The relative location of the additional sensors and/or light emitters may be calculated using a similar approach as discussed above.

Figure 9:
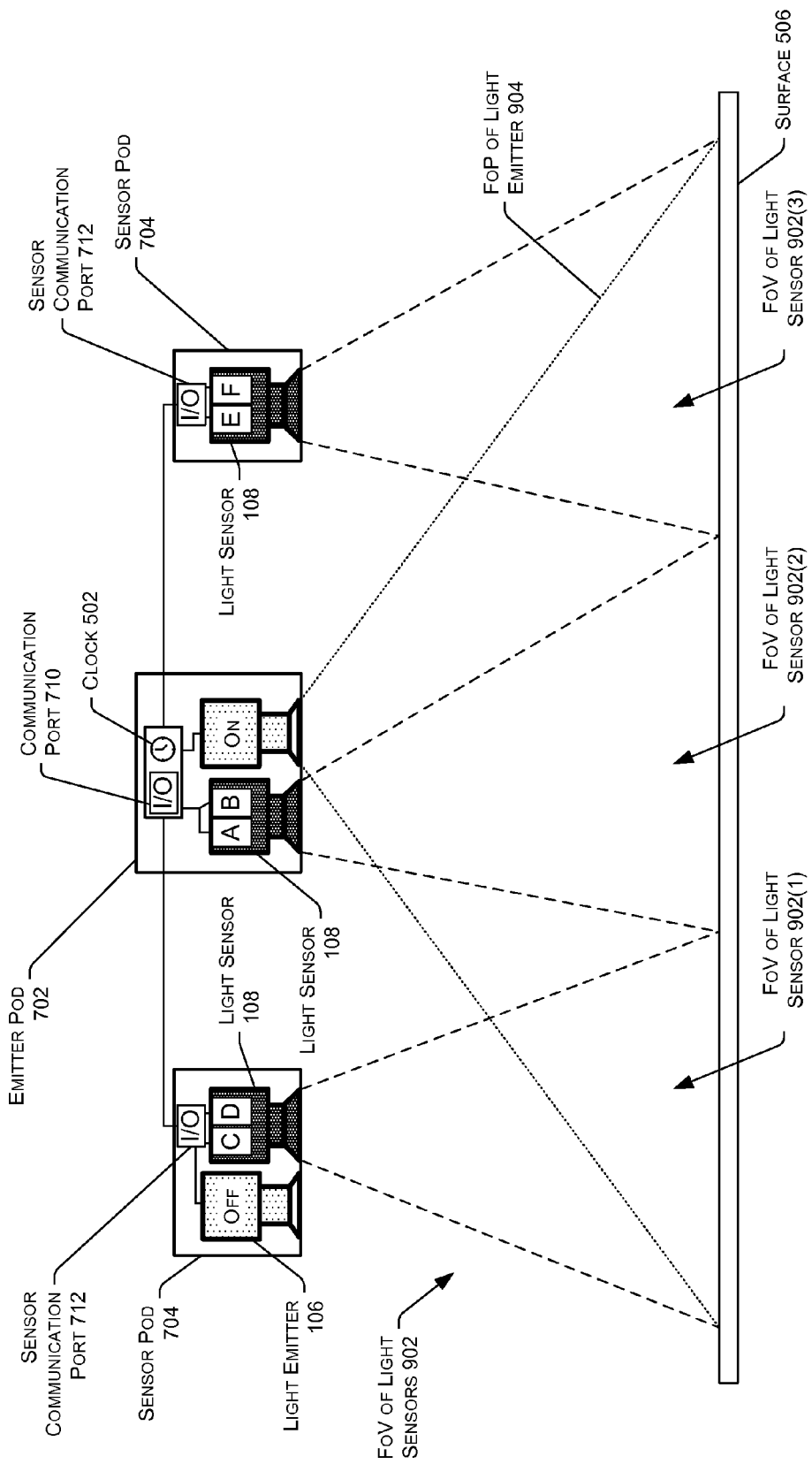
FIG. 9 illustrates an example environment that illustrates optical communication between light emitters and light sensors using light reflected off of a surface.

FIG. 9 illustrates an example environment that illustrates optical communication between light emitters and light sensors using light reflected off of a surface. Each of the sensor pods 704 includes one of the light sensors 108 having a field-of-view (FoV) 902. The FoV is determined by an angle by which each light sensor receives light, which results in an amount of surface area of the surface 506 that is viewable by the corresponding light sensor. The FoV 902 may be modified, selected, or adjusted optically (e.g., using different lenses) or digitally (e.g., digital editing, etc.). As shown in FIG. 9, each of the light sensors has a FoV 902(1), 902(2), and 902(3). The FoV 902 may be selected such that the surface area of the surface 506 is viewable by at least one of the light sensors. The configuration shown in FIG. 9 may be used to determine a relative location of light emitters, light sensors, or pods, as described with reference to FIG. 10.

Figure 10:
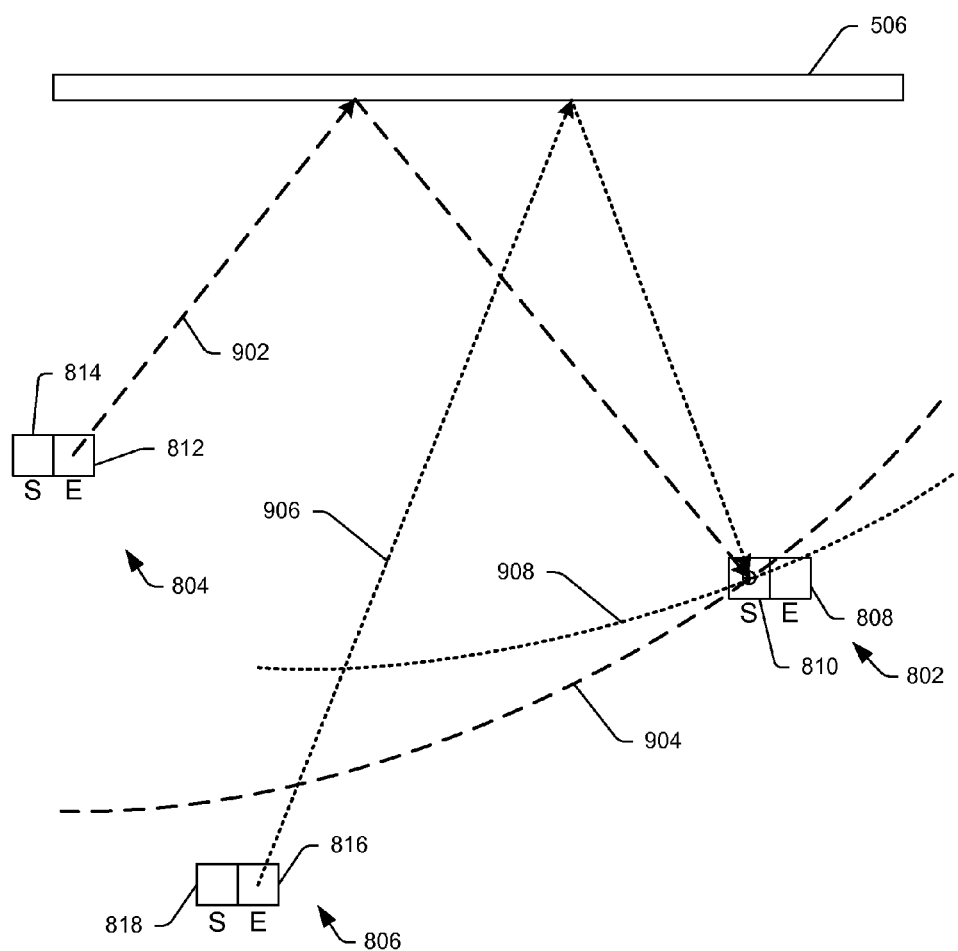
FIG. 10 illustrates an example environment to perform calibration where light sensors receive light from light emitters after the light reflects off of a surface.

FIG. 10 illustrates an example environment to perform calibration where light sensors receive light from light emitters after the light reflects off of a surface. In the following example, the relative location of the first pod 802 (or the first sensor 810) is determined. The relative location of the other pods may be determined using similar techniques, which are described in part in the description with reference to FIG. 8.

In accordance with various embodiments, the second light emitter 812 may emit light 902 that is reflected off the surface 506 and then received by the first light sensor 810. The light 902 received by the first light sensor 810 may be used to determine distance information using captured light. The distance information may then be used to determine a first distance profile 904 associated with the first pod 802 and the second pod 804, or more precisely, the second light emitter 812 and the first light sensor 810. The distance profiles are arcs that represents possible locations of the light emitters and/or light sensors (or pods) based on the distances calculated using captured light when the light is reflected off the surface 506. The arcs may be associated with the light emitter, the light sensor, or both. Although the distance profile 904 is only shown in FIG. 9 with the first light sensor 810, a distance profile may also be generated for the second light emitter 812 based on the distance information determined using the captured light.

Similarly, the third light emitter 816 may emit light 906 that is reflected off the surface 506 and then received by the first light sensor 810. The light 906 received by the first light sensor 810 may be used to determine a second distance profile 908 associated with the first pod 802 and the third pod 806, or more precisely, the third light emitter 816 and the first light sensor 810.

Based on an intersection of the first distance profile 904 and the second distance profile 908, the relative location of the first light sensor 810 can be determined. As discussed with reference to FIG. 8, this relative location may further be used to provide a relative location of the first pod 802 and/or the first light emitter 808. The exact location of the other light emitters and/or other light sensors (or other pods) occurs by continuing this process.

Figure 11:
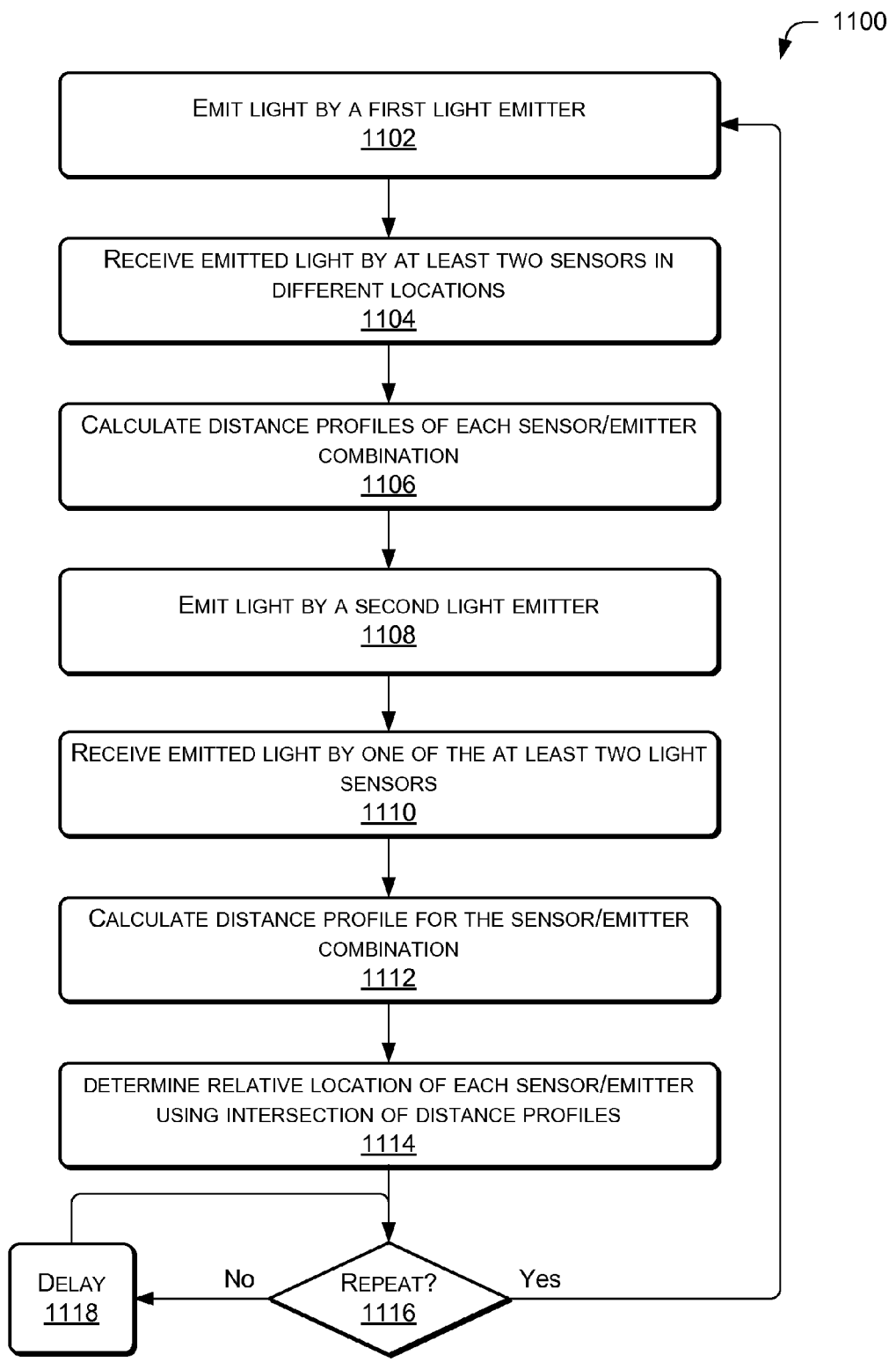
FIG. 11 is a flow diagram of an illustrative process to calibrate a ToF system to determine relative locations of various light sensors and light emitters.

FIG. 11 is a flow diagram of an illustrative process 1100 to calibrate a ToF system to determine relative locations of various light sensors and light emitters. The process 1100 may be performed using the configuration shown in FIG. 8 and/or FIG. 10. The order of the operations is not limited to that shown in FIG. 11. The operations may be performed in parallel or in other sequences. The process 1100 may occur after the devices (e.g., the light sensors, the light emitters, the pods, etc.) have been synchronized as discussed above with respect to the description of FIG. 7.

At 1102, a first light emitter may emit light that can be detected (received, captured, etc.) by at least two light sensors.

At 1104, the light emitted by the first light emitter is received by at least two light sensors that are located in different locations from one another. For example, the first light emitter 808 may emit the light 820, which may be received by the second light sensor 814 and the third light sensor 818, in accordance with the description in reference to FIG. 8. The captured light may be used to determine a reference distance between the respective light emitter and each respective light sensor.

At 1106, the processors 114 may calculate distance profiles of each light sensor and light emitter combination. The distance profiles may be based on the reference distances. For example, the first distance profile 822 and the second distance profile 824 may be calculated by the processors 114, in accordance with the description in reference to FIG. 8.

At 1108, a second light emitter may emit light that can be detected (received, captured, etc.) by at least one other light sensor.

At 1110, the light emitted by the second light emitter is received by at least one other light sensor. For example, the second light emitter 812 may emit the light 830, which may be received by the third light sensor 818, in accordance with the description in reference to FIG. 8.

At 1112, the processors 114 may calculate distance profiles of each light sensor and light emitter combination. For example, the fourth distance profile 832 may be calculated by the processors 114, in accordance with the description in reference to FIG. 8.

At 1114, the processors may determine relative locations of each of the light sensors, the light emitters, and/or the pods using the intersection of the distance profiles. For example, the distance profiles may be generated as equations, which may be solved by the processors 114 to determine the relative locations.

At 1116, the processors 114 may determine whether to repeat the process 1100 to refresh the relative distances, and thus recalibrate the system. For example, the system may be calibrated each time the system is powered on, after movement of any device in the system, after a duration of time, and/or after or in response to other triggering events. When the processors 114 determine to repeat the process 1100 (following the "yes" route from the decision operation 1116), then the process may continue at the operation 1102. However, when the processors 114 determine not to repeat the process 1100 (following the "no" route from the decision operation 1116), then the process may continue at an operation 1118, which may cause a delay prior to returning to the decision operation 1116. Other loops are possibly which may initiate the calibration to determine the relative locations as discussed herein.

Figure 12:
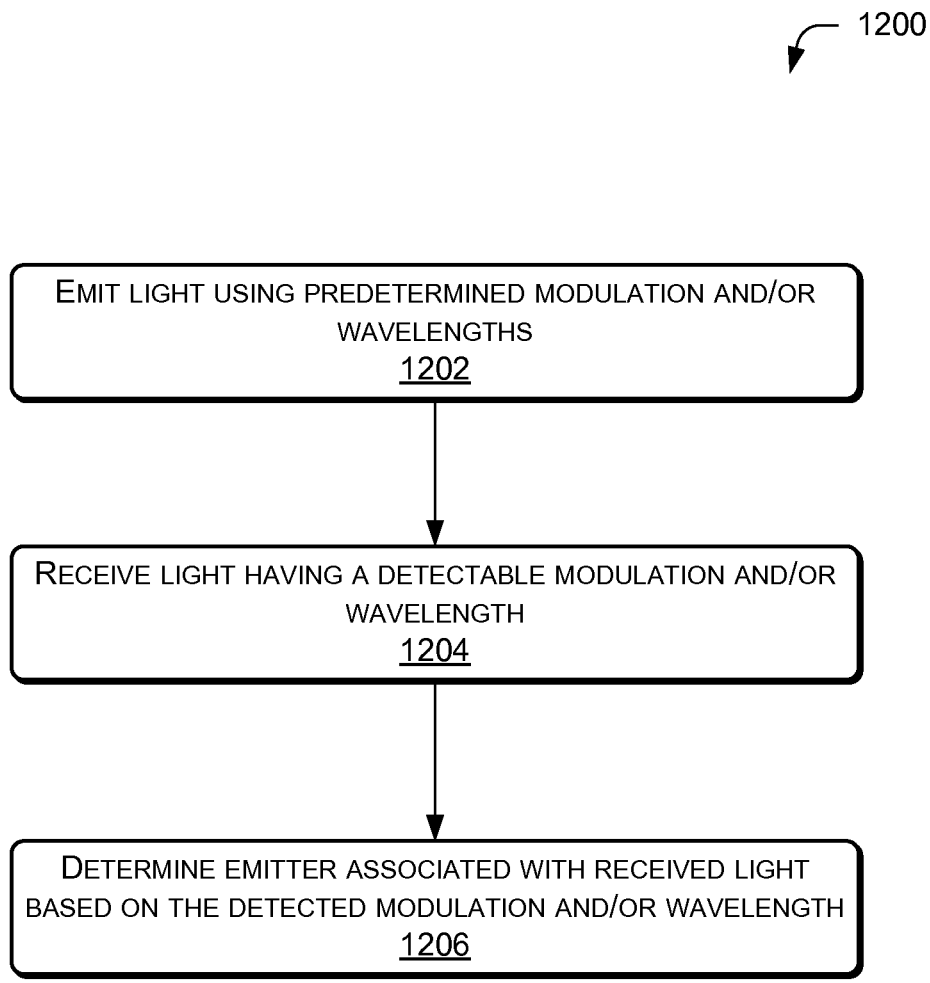
FIG. 12 is a flow diagram of an illustrative process to identify a light emitter based on characteristics of the light emitted by the light emitter.

FIG. 12 is a flow diagram of an illustrative process 1200 to identify a light emitter based on characteristics of the light emitted by the light emitter.

In accordance with various embodiments, the light emitted by the light emitters may include characteristics that can be used to identify the source of the light, and thus determine the light emitter that emitted the light. The characteristics may include a wavelength of the light, a modulation of the light, and/or other characteristics of the light that may be used without disrupting the distance calculations used to determine a distance of travel of the light.

At 1202, a light emitter may emit light that includes predetermined characteristics, such as a predetermined modulation, a predetermined wavelength, and/or other predetermined characteristics.

At 1204, a light sensor may receive the light having the predetermined characteristics.

At 1206, the processors 114 may determine which light emitter emitted the light at the operation 1202 based on the predetermined characteristics identified in the received light at the operation 1204.

In some embodiments, the process 1200 may be used with the process 1100 to enable coordination of the emission of light and distance calculations for various light emitters and light sensors. In some instances, multiple light emitters may be operation at a same time while emitting light having different predetermined characteristics (e.g., different wavelengths, etc.), which may enable receipt of the light and then association of the light with the respective light emitter when performing the distance calculations and creating the distance profiles, as discussed herein.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a first unit having a first light emitter and a first time-of-flight (ToF) sensor;
   a second unit having a second light emitter and a second ToF sensor;
   a third unit having at least a third ToF sensor;
   a plurality of links to provide communications between the first unit, the second unit, and the third unit;
   one or more processors to perform acts including:
   coordinating, using the plurality of links, operation of the first unit, the second unit, and the third unit;
   determining relative locations of each of the first unit, the second unit, and the third unit by:
   determining reference distances based at least in part on ToF values obtained by the first ToF sensor, the second ToF sensor, and the third ToF sensor based at least in part on a first pulse of light emitted in a first fixed direction by the first light emitter and a second pulse of light emitted in a second fixed direction by the second light emitter, the first pulse of light illuminating a field of view that includes the second ToF sensor and the third ToF sensor,
   the reference distances determined between:
   the first unit and the second unit,
   the first unit and the third unit, and
   the second unit and the third unit;
   creating distance profiles using the reference distances, the distance profiles associated with locations of each of the first unit, the second unit, and the third unit, and
   determining the relative locations of each of the first unit, the second unit, and the third unit based at least in part on the distance profiles; and
   determining distance information associated with objects based at least in part on the ToF values obtained by one or more of the first ToF sensor, the second ToF sensor, or the third ToF sensor.

2. The system as recited in claim 1, wherein the first light emitter emits the first pulse of light that includes a first characteristic that associates the first pulse of light as being emitted from the first light emitter, and wherein the second light emitter emits the second pulse of light that includes a second, different characteristic that associates the second pulse of light as being emitted from the second light emitter, the first characteristic and the second characteristic having at least one of a different wavelength of light or a different modulation of light.

3. The system as recited in claim 1, wherein the one or more processors determine the relative locations of each of the first unit, the second unit, and the third unit in response to at least one of:
   powering on the system,
   a passage of a predetermined amount of time, or
   movement of the first unit, the second unit, or the third unit.

4. The system as recited in claim 1, wherein the coordinating includes:
   synchronizing a clock associated with each of the first unit, the second unit, and the third unit; and
   determining a first time associated with the emitting of the first pulse of light and a second time associated with the emitting of the second pulse of light, and
   wherein the determining reference distances is based at least in part on the first time and the second time.

5. A method comprising:
   coordinating operation of a plurality of units to determine relative distance information, each unit including a light emitter and at least one light sensor;
   performing, for each of the plurality of units:
   emitting a pulse of light in a fixed direction from a light emitter in a unit, the pulse of light illuminating a field of view that includes each light sensor in other units of the plurality of units,
   capturing the pulse of light by each light sensor in the other units,
   determining, based at least in part on the pulse of light captured by light sensors in the other units, distances between the light sensors in the other units and the light emitter in the unit, and
   determining a distance profile for each combination of the light emitter and the light sensors in the other units; and
   determining a relative location of each of the plurality of units based at least in part on the distance profiles.

6. The method as recited in claim 5, wherein the pulse of light is reflected off a surface prior to capture by the light sensors in the other units.

7. The method as recited in claim 5, wherein the coordinating the operation includes synchronizing the plurality of units to operate using same time intervals, the coordinating performed using at least one of a radio link or a wired link that provides communication between the plurality of the units.

8. The method as recited in claim 5, wherein the light emitter emits light that includes a characteristic that associates the pulse of light as being emitted from the respective light emitter.

9. The method as recited in claim 8, wherein the characteristic is at least one of a wavelength of the pulse of light or a modulation of the pulse of light.

10. The method as recited in claim 5, wherein the relative location of each of the light emitter and the light sensors in the plurality of the units is extrapolated to determine the relative location of each of the plurality of the units.

11. The method as recited in claim 5, wherein the performing is initiated in response to powering on at least a portion of a system that includes the plurality of the units.

12. The method as recited in claim 5, wherein the performing is initiated in response to at least one of movement of one of the plurality of the units or a passage of a predetermined amount of time.

13. The method as recited in claim 5, wherein the light sensor is a time-of-flight (ToF) sensor, and wherein the determining the distances between the ToF sensor in the other units and the light emitter in the unit is performed by determining relative distance information detected by the ToF sensor.

14. The method as recited in claim 5, wherein the relative location of each of the plurality of units is based on intersections of the distance profiles.

15. The method as recited in claim 5, further comprising determining distance information associated with objects based on time-of-flight (ToF) values obtained by the plurality of units.

16. The method as recited in claim 5, further comprising:
adding an additional unit that includes at least one additional light sensor; and
determining the relative location of the additional unit by:
capturing, by the at least one additional light sensor and at different times, light emitted by two different light emitters of the plurality of units,
determining additional distance profiles associated with the additional unit by determining, based at least in part on the pulse of light captured by the at least one additional light sensor, distances between the additional unit and the two different light emitters of the plurality of units, and
determining a relative location of the additional unit and the plurality of units based at least in part on the additional distance profiles.

17. A method comprising:
coordinating operation of a plurality of units to perform relative distance calculations, the plurality of units each including at least one of a light emitter or a light sensor;
determining distances between each of the plurality of units by, for each pair of units, emitting a pulse of light in a fixed direction from the light emitter in one unit and capturing the pulse of light by the light sensor in at least two other units; and
determining relative locations of each of the plurality of units relative to each other based at least in part on the determined distances.

18. The method as recited in claim 17, wherein each light emitter emits light that includes a characteristic that associates the pulse of light as being emitted from the respective light emitter.

19. The method as recited in claim 18, wherein the characteristic is at least one of a wavelength of the pulse of light or a modulation of the pulse of light.

20. The method as recited in claim 17, wherein the determining the distances is initiated in response to at least one of powering on a system that includes the plurality of the units or detecting movement of one of the plurality of the units.

21. The method as recited in claim 17, wherein the coordinating the operation is performed by exchanging signals between the plurality of units using at least one of radio links or wired links that provide communication between the plurality of the units.

22. The method as recited in claim 17, wherein the pulse of light is reflected off a surface after being emitted by the light emitter and prior to capture by the light sensor.

23. The method as recited in claim 17, wherein the light sensor is a time-of-flight (ToF) sensor, and wherein the determining the distances between the ToF sensor in the other units and the light emitter in the unit is performed by determining relative distance information detected by the ToF sensor.

24. The method as recited in claim 17, further comprising using the plurality of units to determine distance information associated with objects after determining the relative locations of the plurality of the units.

25. The method as recited in claim 17, further comprising creating distance profiles using the determined distances, the distance profiles associated with locations of each of the plurality of units, and wherein the determining the relative locations of each of the plurality of units relative to each other based is based at least in part on intersections of the distance profiles.

\* \* \* \* \*